(No Model.)

M. PETERS.
VALVE.

No. 594,097. Patented Nov. 23, 1897.

Witnesses
C. E. Buckland.
Andrew Ferguson.

Inventor
Meinert Peters
By W. E. Simonds
Attorney

UNITED STATES PATENT OFFICE.

MEINERT PETERS, OF HARTFORD, CONNECTICUT.

VALVE.

SPECIFICATION forming part of Letters Patent No. 594,097, dated November 23, 1897.

Application filed September 27, 1895. Serial No. 563,840. (No model.)

*To all whom it may concern:*

Be it known that I, MEINERT PETERS, a citizen of the German Empire, residing at Hartford, in the county of Hartford and State of Connecticut, have invented a certain new and useful Improvement in Valves, of which the following is a description, reference being had to the accompanying drawings, wherein—

Figure 1:
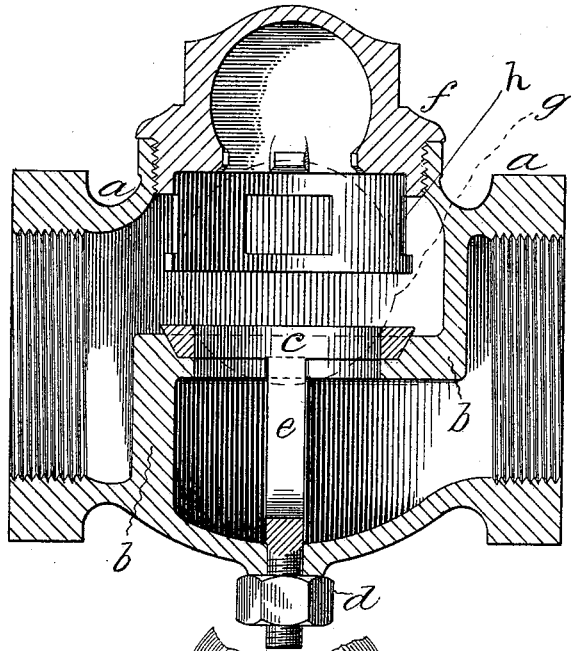
Figure 2:
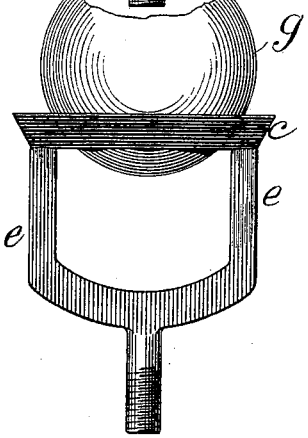

Figure 1 is a view of a valve embodying said improvement in longitudinal central section indicating the ball-valve simply by a broken circular line. Fig. 2 is a detail view of the removable valve-seat and the retaining-rod attached to the same.

The object of the improvement is the production of a valve having a removable valve-seat, a removable ball-valve of large diameter, and a valve-retainer attached to and removable with the removable body-cap.

The letter $a$ denotes the valve-body. $b$ denotes the valve-seat base, which may be and preferably is cast integrally with the valve-body.

$c$ denotes the removable valve-seat held to its place by the nut $d$ taking upon the retaining-rod $e$, which projects from the removable valve-seat. This retaining-rod is bifurcated, each of its two forks attaching to the removable valve-seat at one side thereof.

The letter $f$ denotes a removable body-cap screwing to its seat in the valve-body. The valve and the removable valve-seat are made capable of removal from the valve-body by unscrewing its body-cap $f$, it being necessary, of course, to unscrew the nut $d$ in order to thus remove the removable valve-seat.

The letter $g$ denotes a ball-valve, it being shown or indicated in Fig. 1 simply by a circular dotted line.

The letter $h$ denotes a short sleeve pendent from the body-cap to prevent undue lateral movement of the ball-valve. It may well be called a "valve-retainer."

The ball-valve is of glass. Each of the forks of the bifurcated retaining-rod fits in a socket or mortise made therefor in the rim of the valve-seat base in order to hold the same from rotation.

I claim as my improvement—

The improvement in globe-valves herein described, consisting of the valve-body $a$, having central diaphragm valve-seat base $b$, annular removable valve-seat $c$, fitted in said base, bifurcated retaining-rod $e$, screw-threaded on its stem, and fitted in ways in the rim of the valve-seat base, retaining-nut $d$, ball-valve $g$, fitting the annular seat $c$, removable body-cap $f$, having screw-threaded connection with the valve-body $a$, and valve-retainer $h$, vertically pendent from the said removable body-cap $f$, all substantially as and for the purpose specified.

MEINERT PETERS.

Witnesses:
W. E. SIMONDS,
ANDREW FERGUSON.